US011958169B2

(12) United States Patent
Levins

(10) Patent No.: US 11,958,169 B2
(45) Date of Patent: Apr. 16, 2024

(54) CHAINSAW ACCESSORY

(71) Applicant: David Levins, Ft White, FL (US)

(72) Inventor: David Levins, Ft White, FL (US)

( * ) Notice: Subject to any disclaimer, the term of this patent is extended or adjusted under 35 U.S.C. 154(b) by 134 days.

(21) Appl. No.: 17/501,908

(22) Filed: Oct. 14, 2021

(65) Prior Publication Data

US 2022/0032427 A1 Feb. 3, 2022

Related U.S. Application Data

(60) Provisional application No. 63/105,827, filed on Oct. 26, 2020.

(51) Int. Cl.
*B25B 15/02* (2006.01)
*B27B 17/08* (2006.01)

(52) U.S. Cl.
CPC .............. *B25B 15/02* (2013.01); *B27B 17/08* (2013.01)

(58) Field of Classification Search
CPC ................................ B25B 15/02; B27B 17/08
USPC ................................................. 81/177.4, 490
See application file for complete search history.

(56) References Cited

U.S. PATENT DOCUMENTS 3,276,299 A * 10/1966 Halburian ................ G10D 3/20 81/437
4,569,259 A * 2/1986 Rubin ................. F16B 23/0061 81/460
4,578,835 A * 4/1986 Pichler ...................... B25F 1/00 7/168
4,801,137 A * 1/1989 Douglass ............. A63B 21/075 482/82
5,553,340 A * 9/1996 Brown, Jr. ................ B25F 1/04 81/177.4
6,170,361 B1 * 1/2001 Yates ...................... B29C 73/08 81/490
6,739,224 B1 * 5/2004 Wershe .................. B25G 1/085 81/177.4
6,865,760 B2 * 3/2005 Oberndorfer .......... B23D 71/04 7/165
7,059,021 B1 * 6/2006 Huang ...................... B25B 9/00 16/442
7,559,579 B2 * 7/2009 Furlani .................. A63C 11/10 280/809
8,365,420 B2 * 2/2013 Pellenc ................... B27B 17/14 81/176.2
9,032,928 B2 * 5/2015 Abell ........................ F02N 3/02 123/185.3

(Continued)

*Primary Examiner* — Hadi Shakeri
(74) *Attorney, Agent, or Firm* — Chris Tanner; BlueCollarIP.com

(57) ABSTRACT

A mechanism for reducing time-lost to tedious but necessary adjustments while using a chainsaw is disclosed, as well as methods of manufacture and use. An embodiment has a metal part fitting inside a plastic handle portion, where the two are sometimes assembled in two halves and then pressed molded or fastened together, in the form of a pull-handle positioned at the end of a starter-cord on a chainsaw. Another embodiment has the metal part containing a flat-blade screwdriver surface at one end, which matches and mates with some type of slotted adjustment fixture within the chainsaw; and where the other end has a socket wrench which matches up with an adjustment bolt within the chain-saw. Yet another embodiment has a dog-bone (socket) wrench fitting at one end, and a flat-blade at the other end.

10 Claims, 23 Drawing Sheets

(56) References Cited

U.S. PATENT DOCUMENTS

2015/0286241 A1* 10/2015 Locke ...................... G05G 1/06
74/525

* cited by examiner

CHAINSAW ACCESSORY

BACKGROUND OF THE INVENTION

Chainsaws can be difficult to work with over long periods of time. The blades work their way loose and often need adjustment. Even the best chainsaws have this problem and thus require frequent maintenance.

As such, workers who use chainsaws over long shifts are slowed down and impeded by having to constantly adjust their chainsaws, most often because the chains come loose, but also other reasons. The chain itself is tightened through use of a specific type of screwdriver. Further, operating the chainsaw with the cover off is dangerous and a violation of OSHA protocols. During use of the chainsaw, the cover must be on and it must be securely tightened.

A chain-adjustment will typically involve 1) stopping production, 2) loosening the cover from the chain/blade combination using for example a wrench to loosen a threaded bolt which secures the cover, 3) applying e.g. 4) a screwdriver to a cinching mechanism which tightens and restores the chain to a proper tension, separately re-adjusting the blade, and then 5) putting the cover back on and tightening the threaded bolt, again using the wrench. Thus, every chain-adjustment also involves a blade-adjustment, a 5-step process, and is tedious and impacts a worker's production. Further, the user may have limited dexterity including being in a tree, on a ladder, a genie-lift, or other space-constrained or access-constrained environment in which the user of the chainsaw has limited space and/or limited use of their hands/feet.

In performing all this, managing the screwdriver, the wrench, the chainsaw itself, as well as the limbs or trees or other mechanisms being cut, is a complex task and often makes a worker wish she had 3 hands. Chainsaw-work should ideally involve using the chainsaw, not stopping the chainsaw to adjust it.

Consequently, an improved mechanism for reducing time-lost to tedious but necessary adjustments while using a chainsaw is desired.

DETAILED DESCRIPTION OF PREFERRED EMBODIMENTS

Figure 3A:
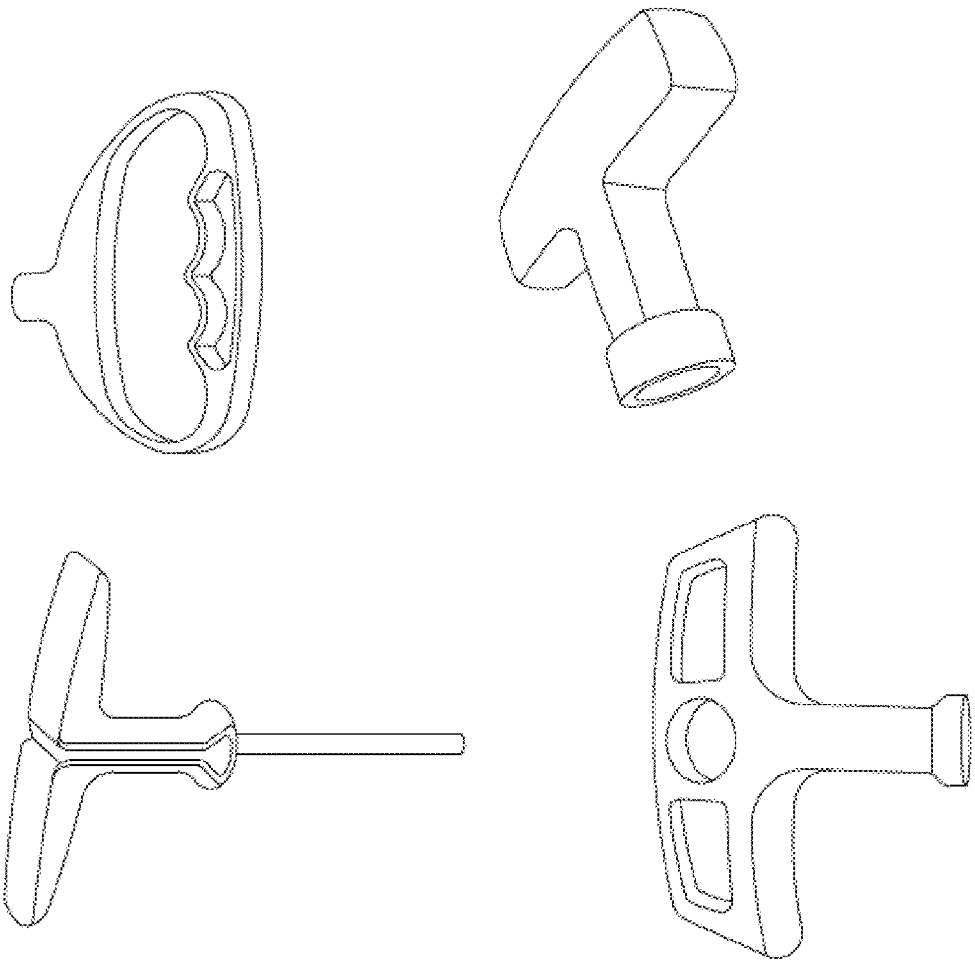
FIG. 3A (Prior Art)
FIGS. 3A-3B (Prior Art). show various conventional pull-handles.
Figure 3B:
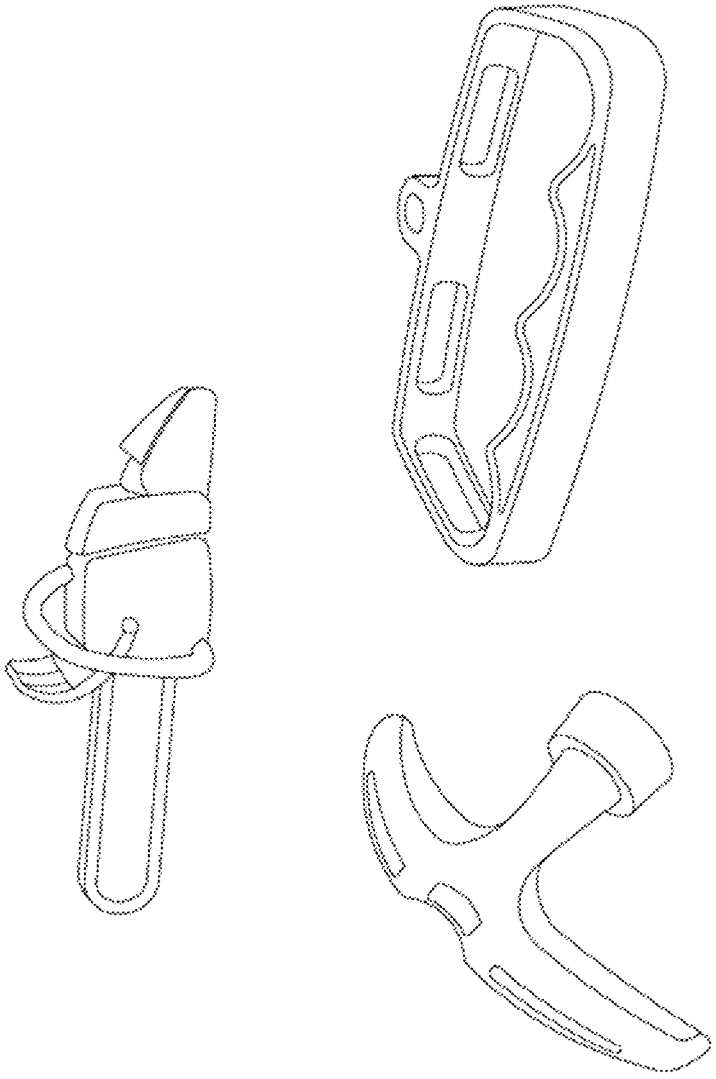
FIG. 3B (Prior Art)

Almost all gas-powered chainsaws are operated by a pull-cord which connects to a starter. The pull-cord must be yanked with sufficient force to cause a starter to engage. To facilitate sufficient starting torque, the chainsaw pull-cord usually has a pull-handle at its end (often T-shaped but sometimes not), which makes the pull-cord easier to grip and yank by a human hand. Although there are many terms for this part, the expression "pull-handle" will be used herein. Various conventional pull-handles are shown in FIGS. 3A-3B (Prior Art).

Figure 1:
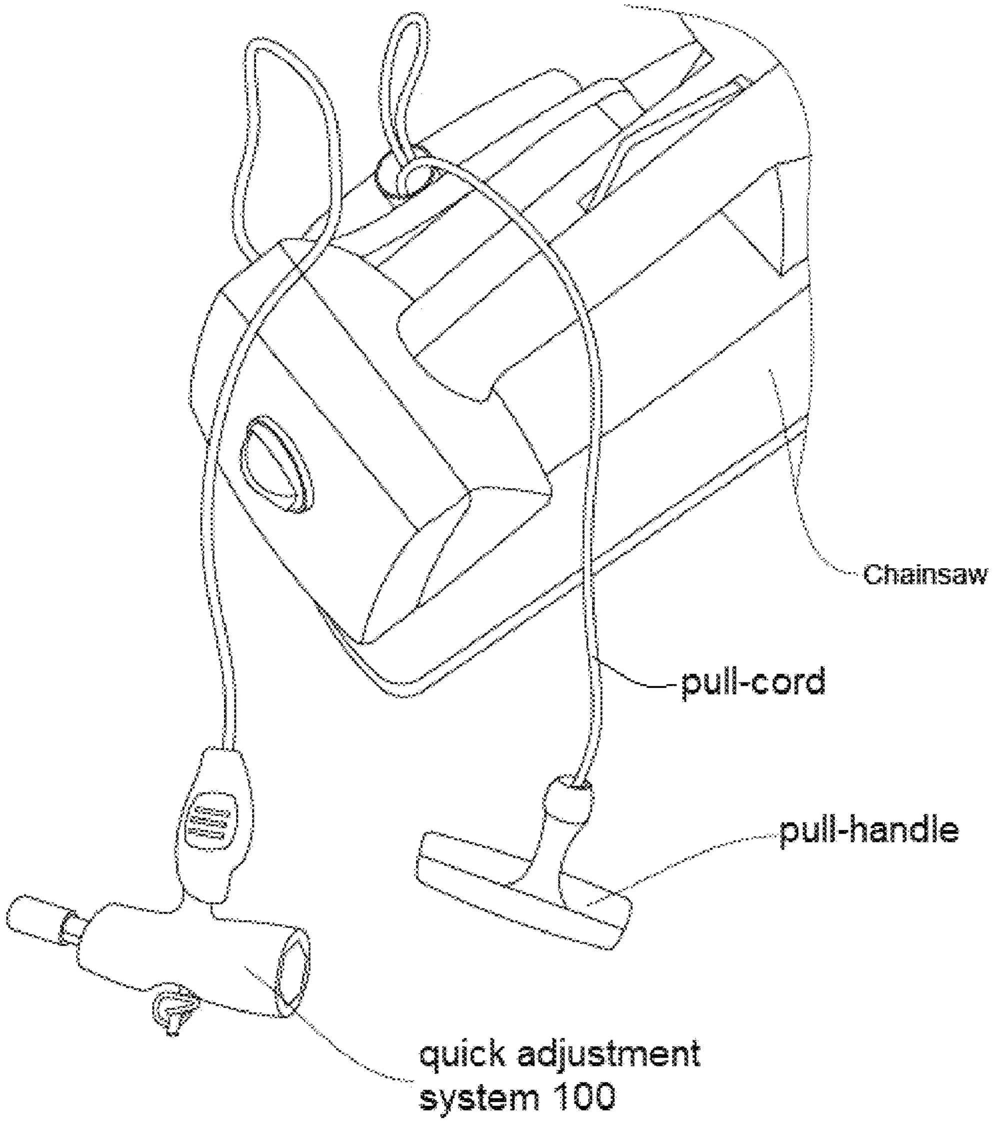
FIGS. 1-2 shows example quick adjustment systems.
Figure 2:
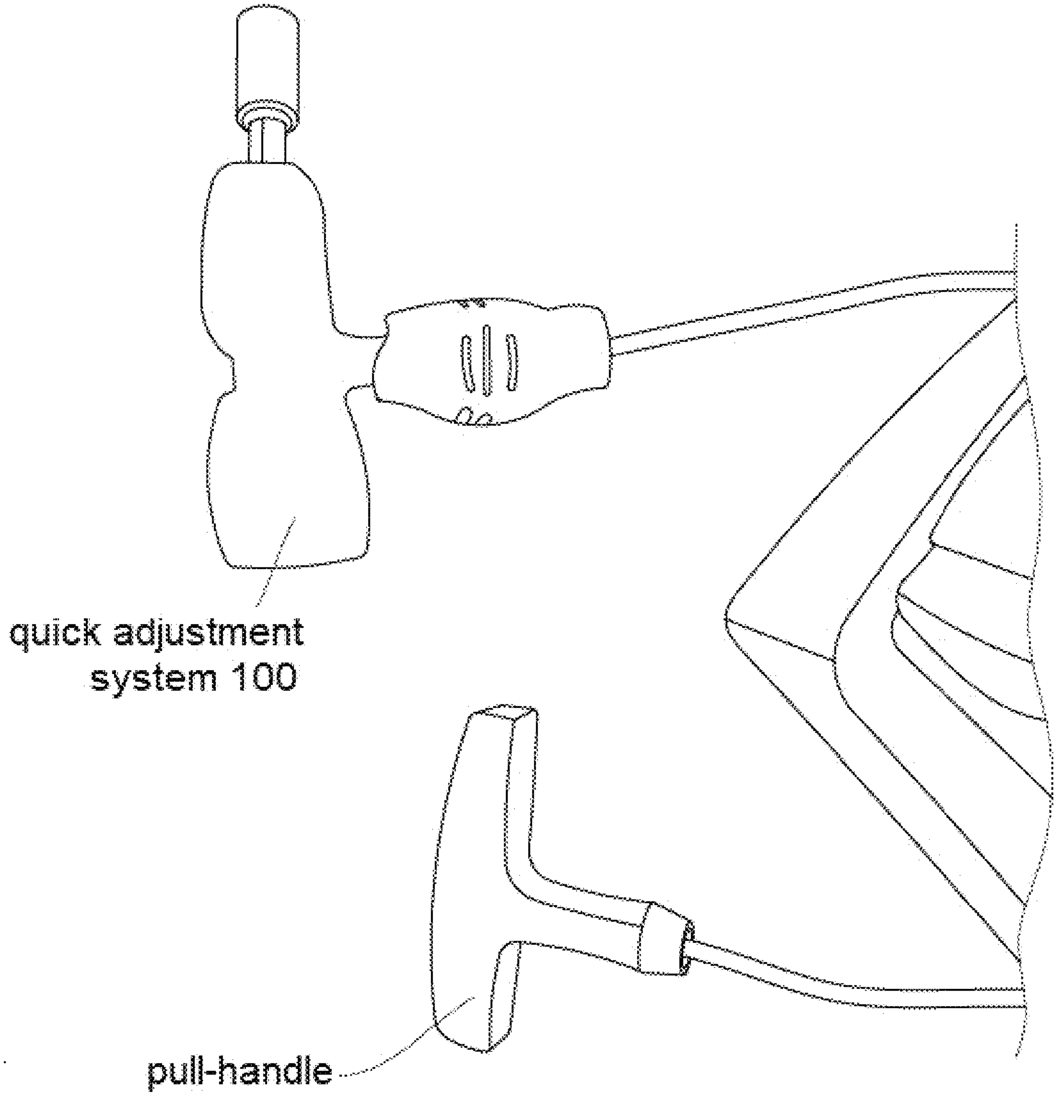

FIGS. 1-2 shows example quick adjustment systems 108 according to the principles described herein. The quick adjustment system 100 is typically attached (although not always) at the end of the pull-cord, and acts as somewhat of a de-facto "handle" as well as separately facilitating quick adjustment. This in turn saves time and effort. Having both the pull-handle and the quick adjustment system 100 located exactly where a worker is expecting them, 100% attached to the chainsaw, never slipping or getting lost, is convenient. This way, it is impossible for important time-saving tools to be dropped, misplaced, or mishandled. However, it is important to note that all important features of a typical chainsaw are preserved within the embodiments herein, and in some cases potentially enhanced.

Within the embodiments herein, a quick adjustment system 100 is either substituted for or added to a pull-handle at the end of the pull-cord. The quick adjustment system 100 may be a combination of a wrench and flat-blade screwdriver which is a common need, as the wrench may tighten/loosen the blade or cover, and the flat blade screwdriver may tighten/loosen the chain. However, many other options and variations are available within the adjustment system 100. For example, FIG. 1 shows an example quick adjustment system 100 with a large-aperture wrench at one side, and a smaller-aperture wrench at the other side. Another embodiment could include a file or chain-sharpening mechanism within the quick adjustment system 100.

In an embodiment, the quick adjustment system 100 is connected to or integrated to be formed within or part of a pull-handle. Achieving this configuration involves making an adjustment to an existing pull-cord, either removing the existing pull-handle and substituting the embodiments herein, or attaching some of the features described herein to a proprietary pull-handle.

Some embodiments of conventional chainsaws and handles have the pull-handle non-removably attached to the pull-cord by a large, strong knot in the cord-material itself. This way, if something goes wrong with the only pull-handle, it may not be necessary to dis-assemble the entire chainsaw including the recoil mechanism. Instead, sometimes a user can replace the pull-handle just by untying the knot and sliding off an impaired pull-handle and sliding on a new pull-handle.

Figure 15A:
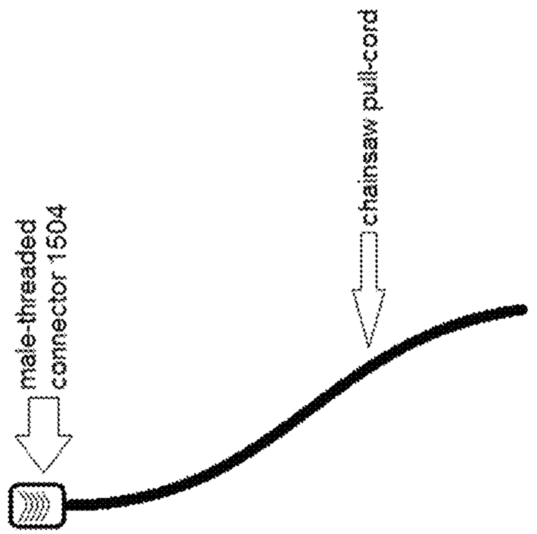
FIG. 15A shows a pull-cord has male threading securely attached thereto.
Figure 15B:
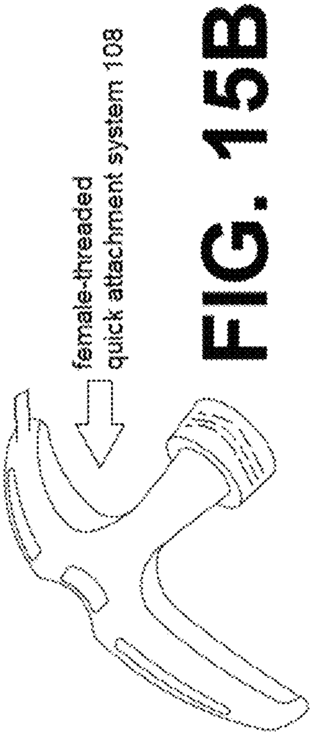
FIG. 15B shows a thread-tapped lower portion of an example quick adjustment system.

Taking advantage of this existing (although not universal) pull-cord circumstance provides is one way, but not the only way, of facilitating installation of the embodiments herein. Another way is shown in FIG. 15A, in which the pull-cord has male threading 1508 securely attached thereto. This male threading 1508 would attach to a thread-tapped lower portion of an example quick adjustment system 100 such as shown in FIG. 15B.

For clarity, the embodiment of the quick adjustment system 100 shown in FIGS. 1 and 2 have the system 100 separately attached by a separate tether.

Figure 13A:
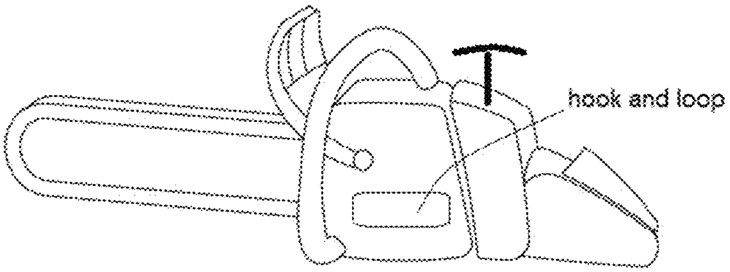
FIGS. 13A, 13B, and 13C show example systems for attaching a quick adjustment system to the body of the chainsaw.
Figure 13B:
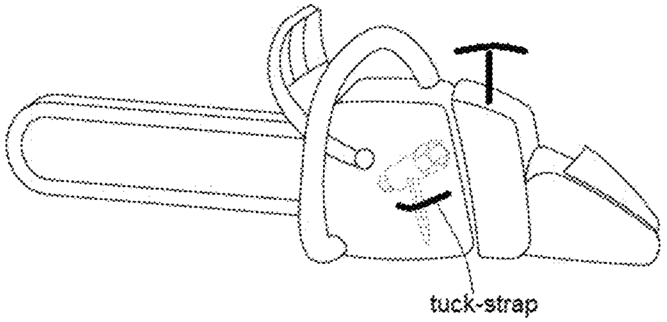
Figure 13C:
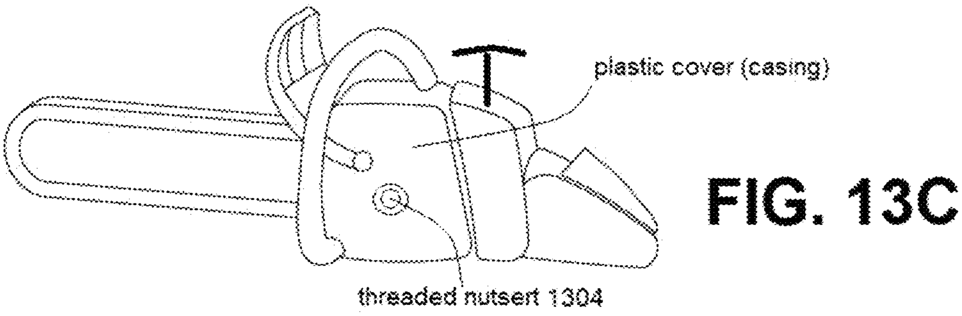

The system 100 may also be attached to the body of the chainsaw, as shown at least within FIG. 13A-13C. However, it is important to not clutter the chainsaw operation experience with too many doo-dads, dongles, and dangling items. Operating a chainsaw must be done safely without lots of accessories that may be occasionally useful, but must not get in the operator's way during times of use. FIG. 13C shows a nutsert 1304 insert-molded into a plastic cover (casing) panel of a chainsaw.

Figure 4A:
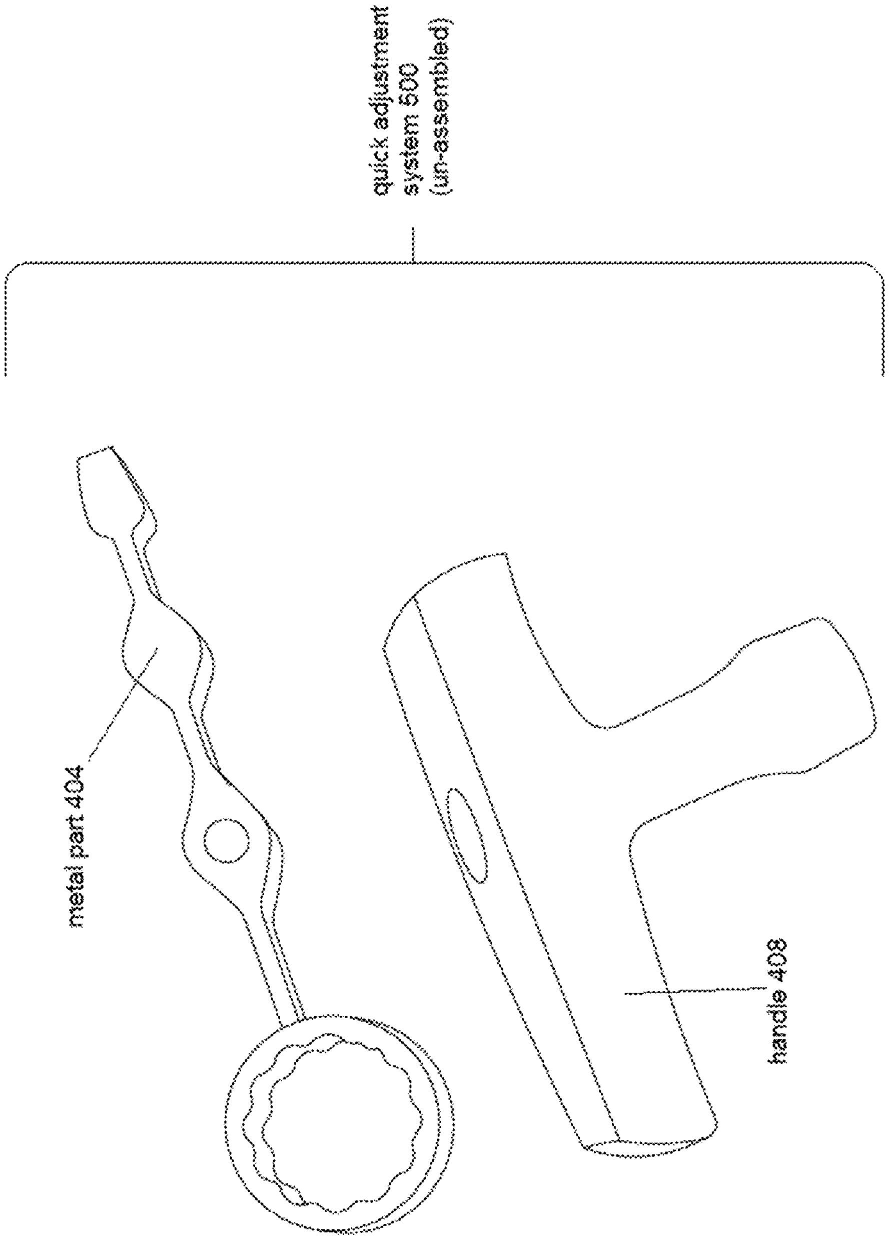
FIGS. 4A-4B and 5A-5B show potential (non-limiting) embodiments of a quick adjustment system.
Figure 4B:
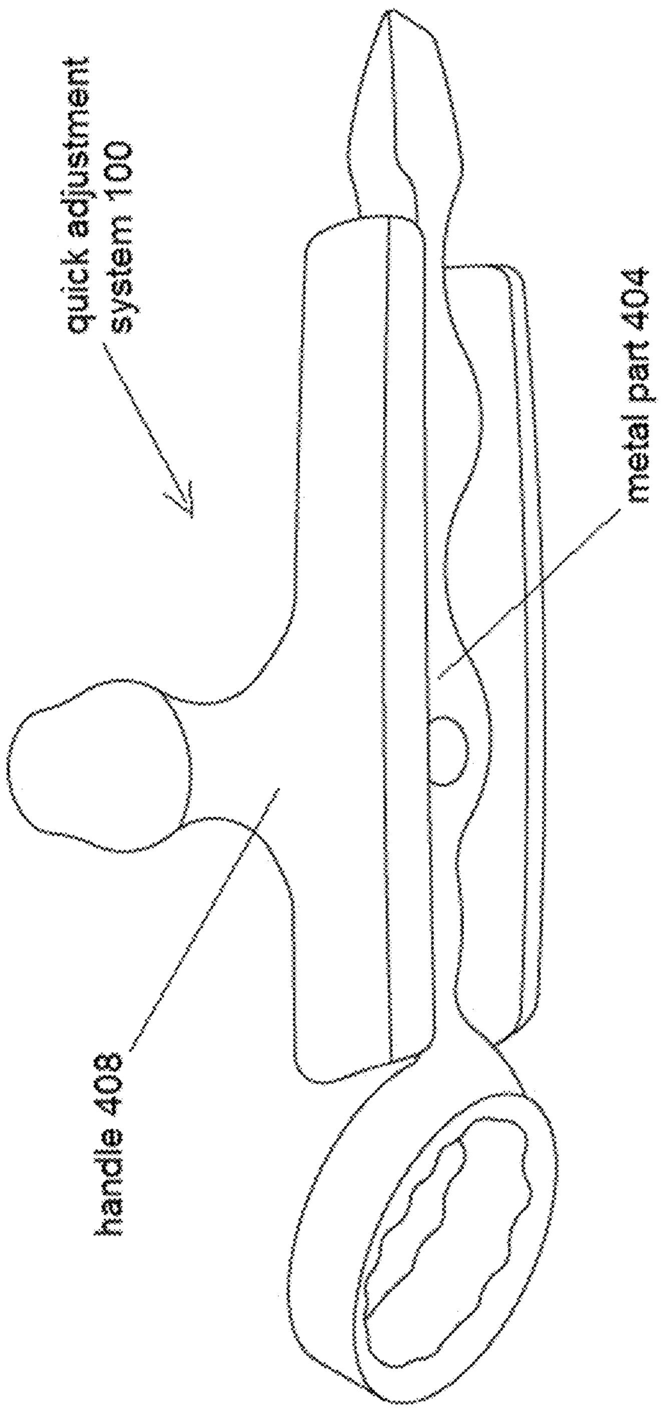
Figure 5A:
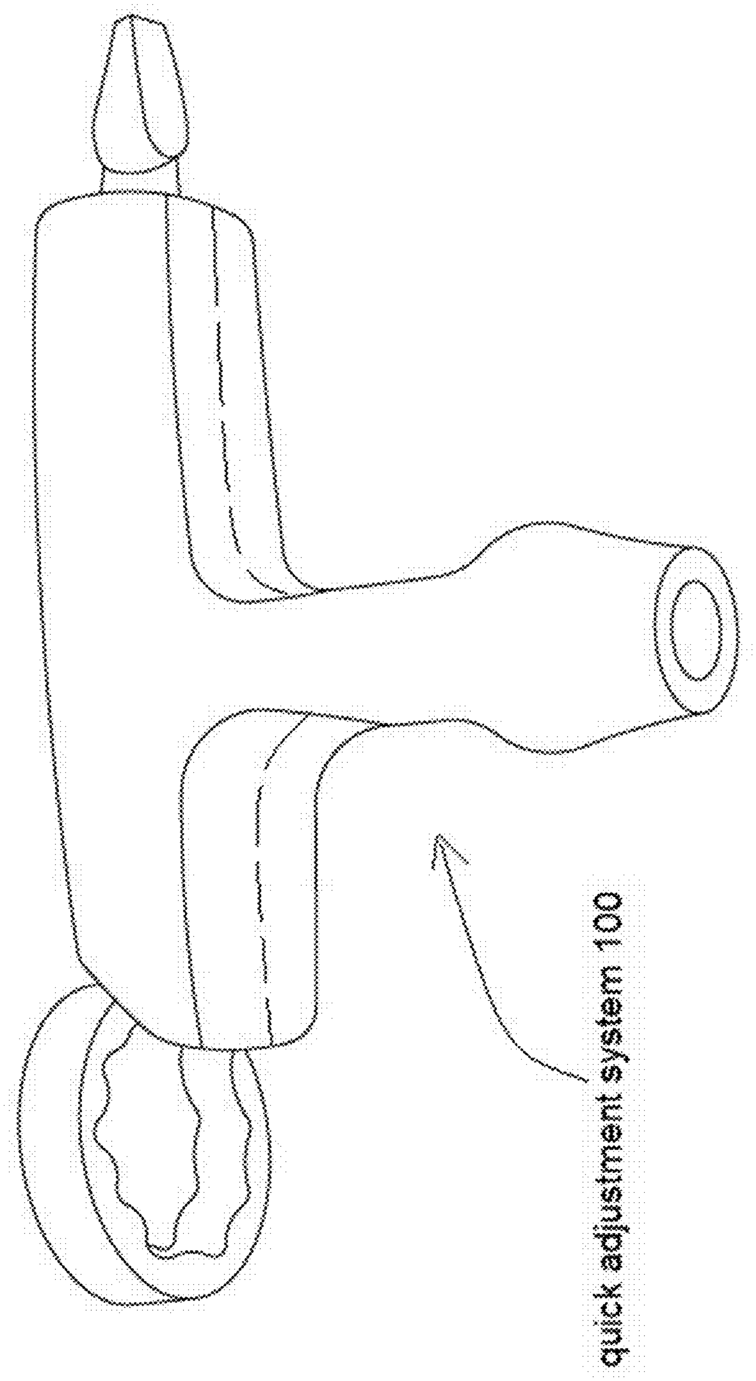
Figure 5B:
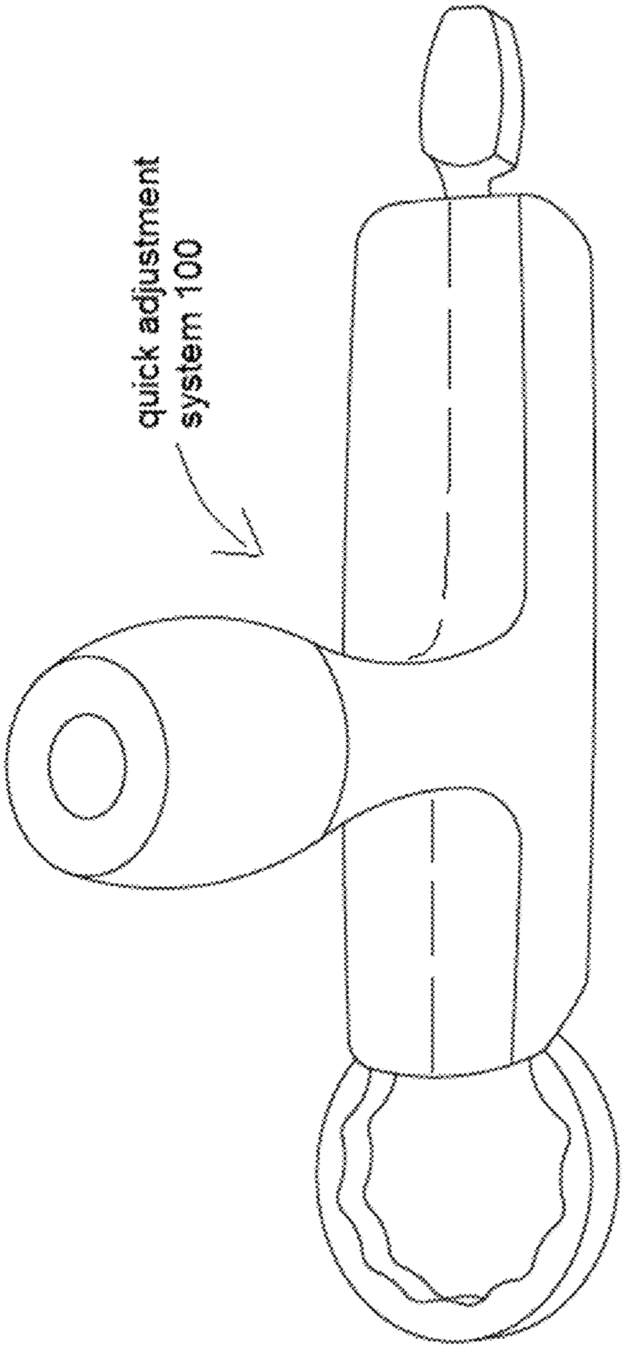

FIGS. 4A-B and 5A-B show potential (non-limiting) embodiments of the quick adjustment system 100. FIG. 4A shows an important detail, which is the uniform and durable manufacture of the metal part 404 that fits inside the plastic handle portion 408 (sometimes assembled in two halves and then pressed molded or fastened together, as symbolized in various drawings herein by dashed lines). Within the embodiments herein, all usages of inserts and metal parts, nutserts, e.g. the metal part 408, these all must be manufactured of the highest durability, as they will be subject to significant stress and sometimes clumsy or impaired usage.

Figure 6:
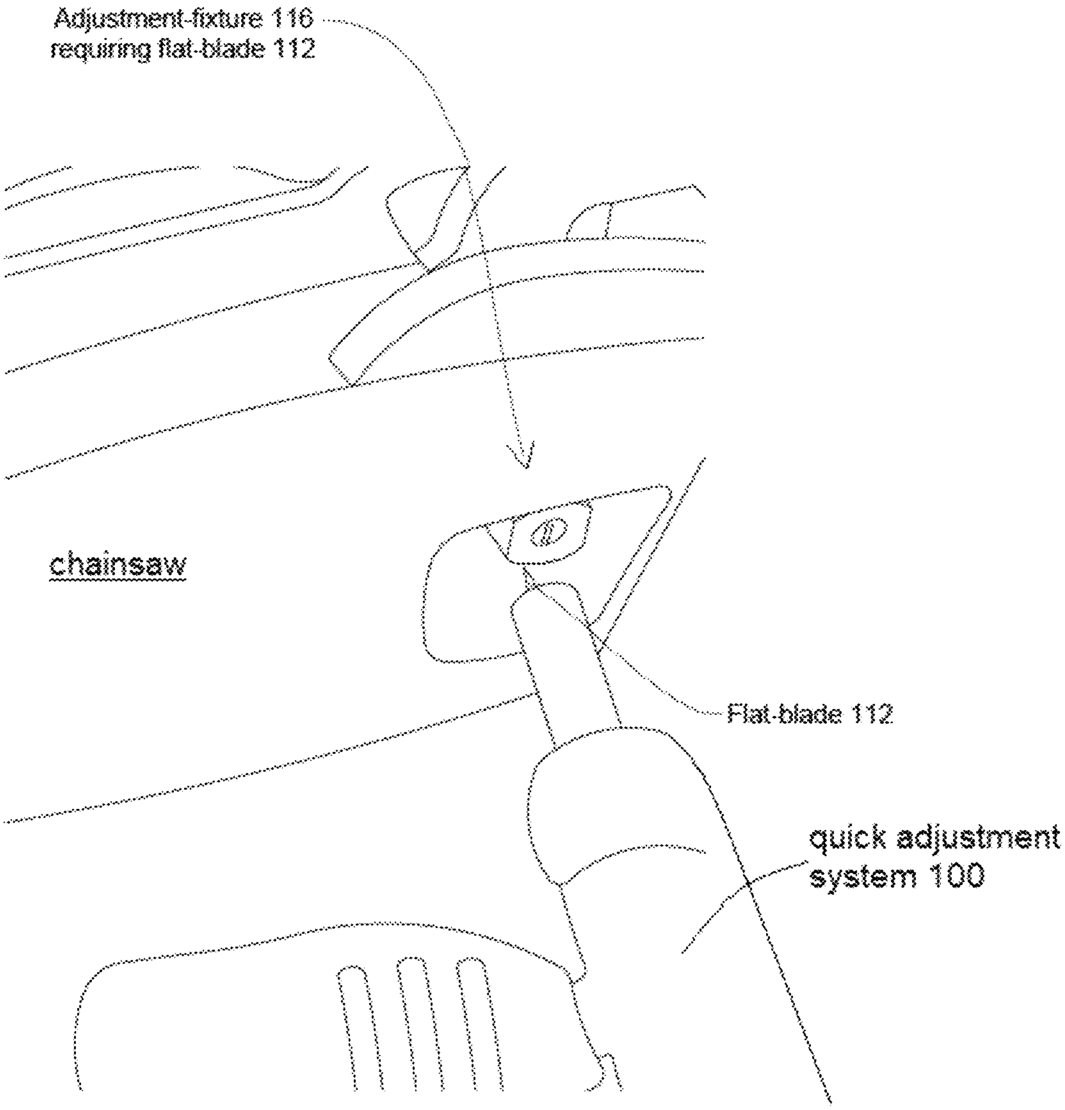
FIG. 6 shows an example usage of a quick adjustment system which matches and mates with some type of slotted adjustment fixture on a chainsaw.

FIG. 6 shows an example usage of the quick adjustment system 100 comprising a flat-blade 112, which matches and mates with some type of slotted adjustment fixture 116 on the chainsaw itself. That is, the slotted adjustment fixture 116 requires a flat-blade for performing whatever type of adjustment. There are so many different chainsaw adjustments it is not possible or useful to try to define them all. Again, the embodiments herein are not limited to what is shown in FIG. 6, instead FIG. 6 is included herein for quick visual clarity.

Figure 7A:
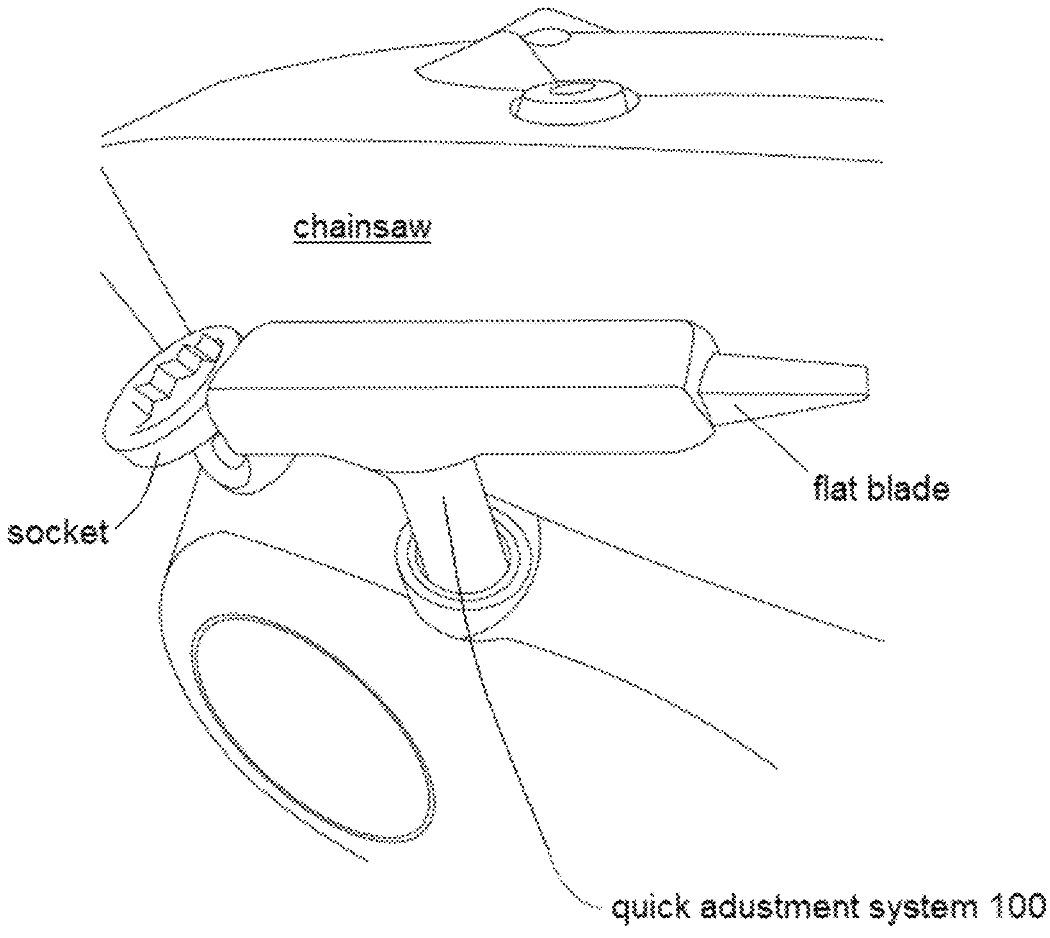
FIG. 7A shows an example quick adjustment system with a dog-bone (socket) wrench fitting at one end, and a flat-blade at the other end.
Figure 7B:
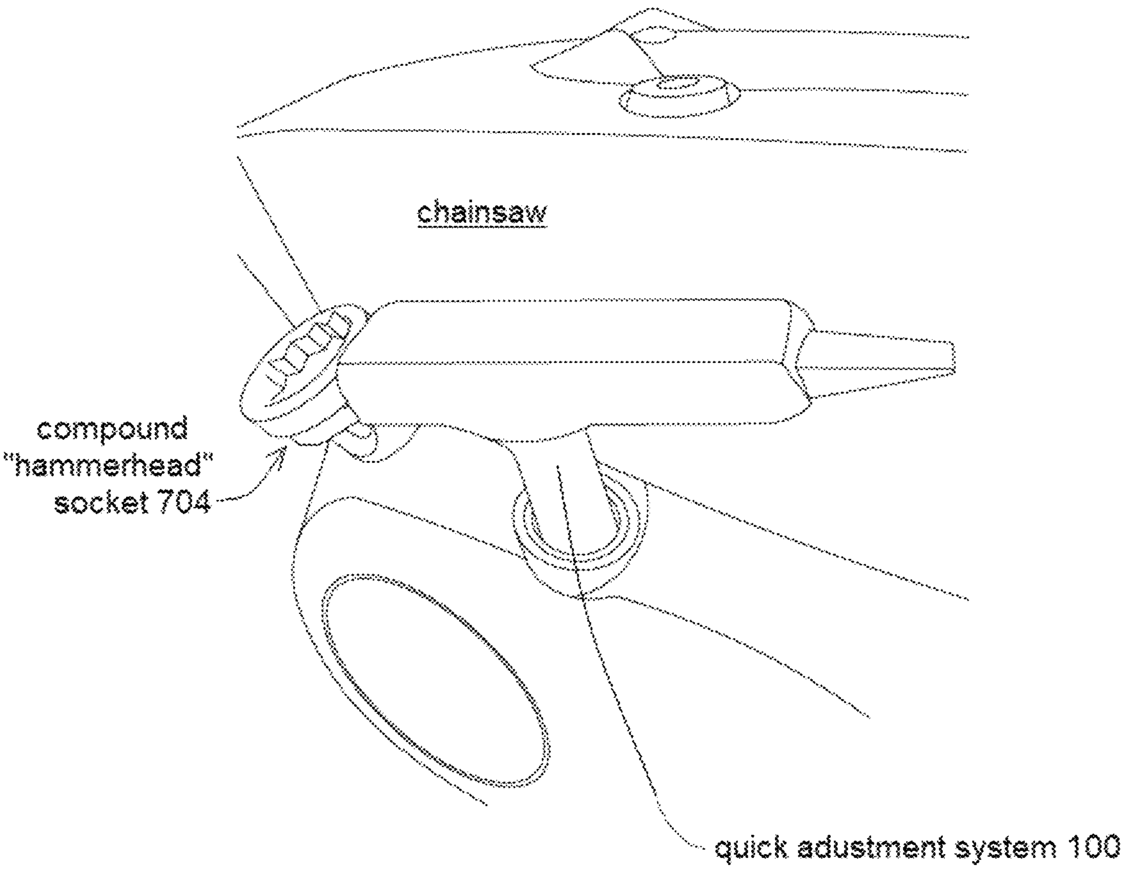
FIG. 7B shows an embodiment with a hammerhead double-socket.
Figure 7C:
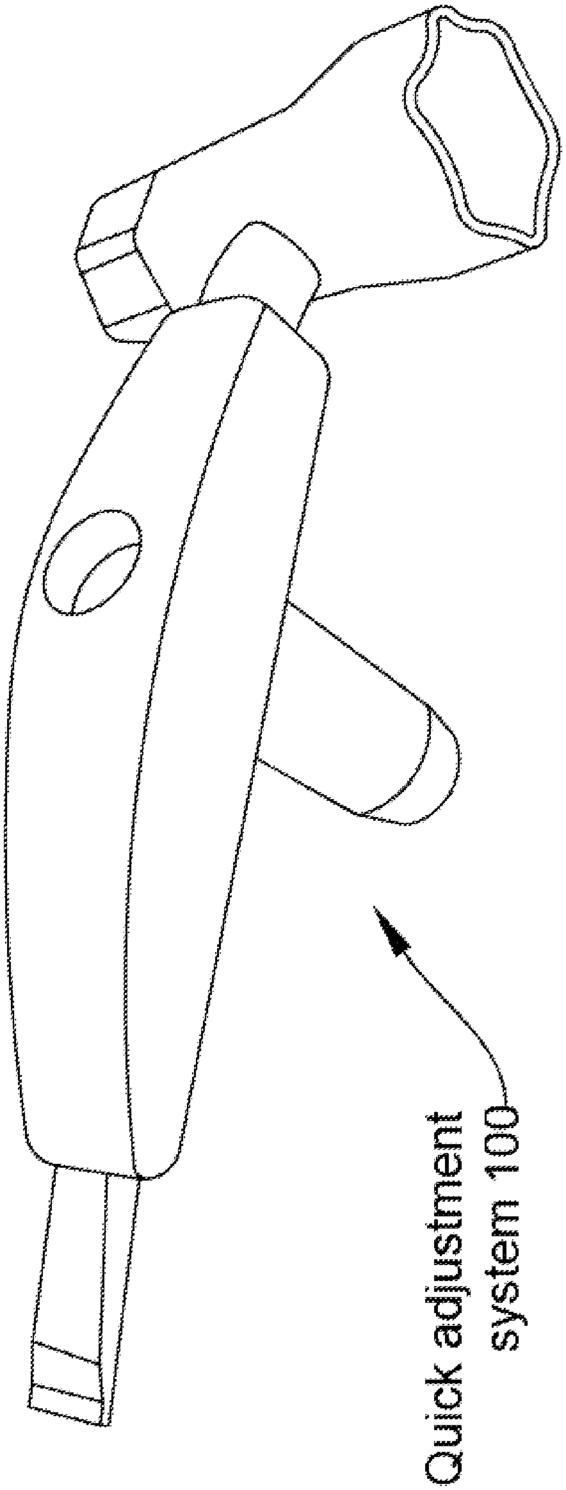
FIG. 7C shows an embodiment with sockets that are positioned 180 degrees apart, having two separate socket-sizes.

FIG. 7A shows an example quick adjustment system 100 in a fully-retracted position, such as but not limited to where the chainsaw is at-rest and not running. The specific embodiment of the quick adjustment system 100 in FIG. 7A has a dog-bone (socket) wrench fitting at one end, and a flat-blade at the other end. However, again, the embodiments within FIG. 7A are only for illustration, and should not be considered as limiting. FIG. 7B shows an embodiment similar to FIG. 7A, except a hammerhead double-socket 704 is implemented. FIG. 7C shows an embodiment of the quick adjustment system 100 with sockets that are positioned 180 degrees apart, having two separate socket-sizes.

Figure 8:
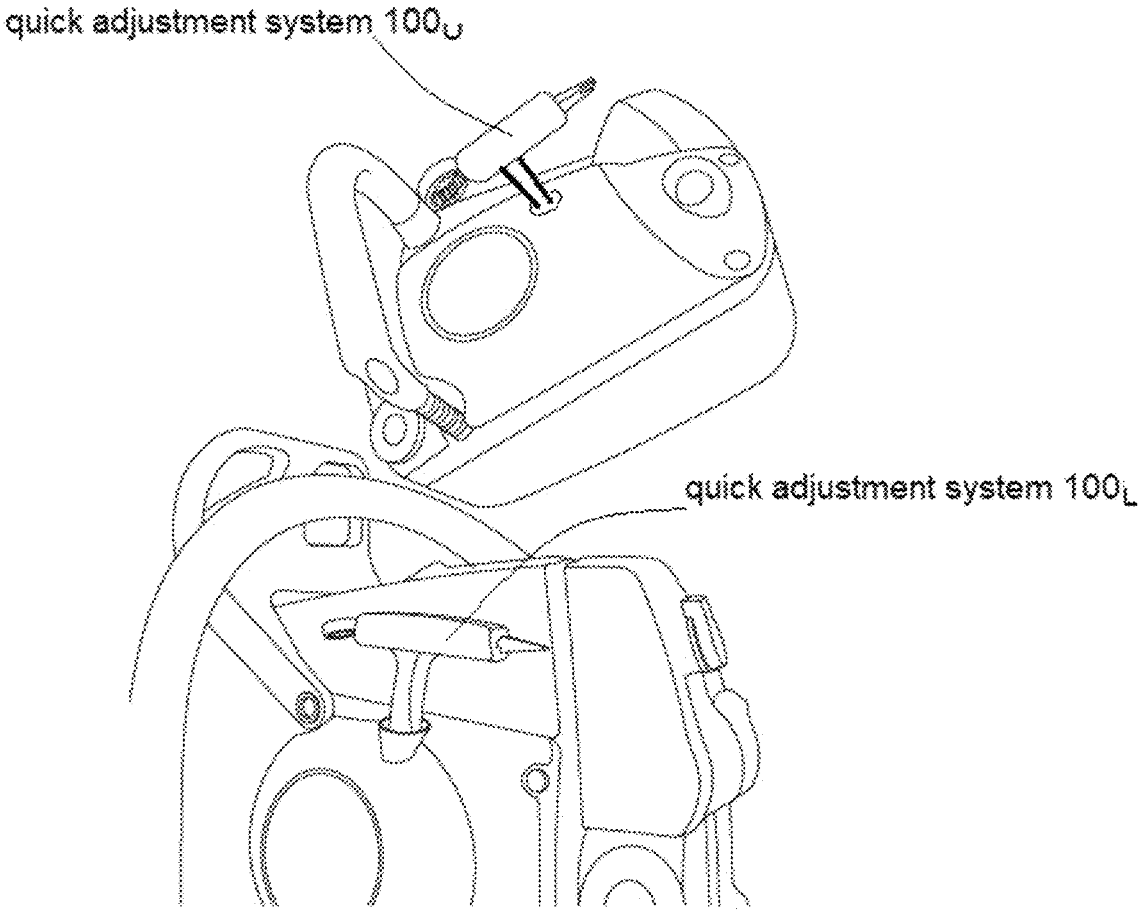
FIG. 8 shows a combined view of two separate quick adjustment systems.
Figure 9:
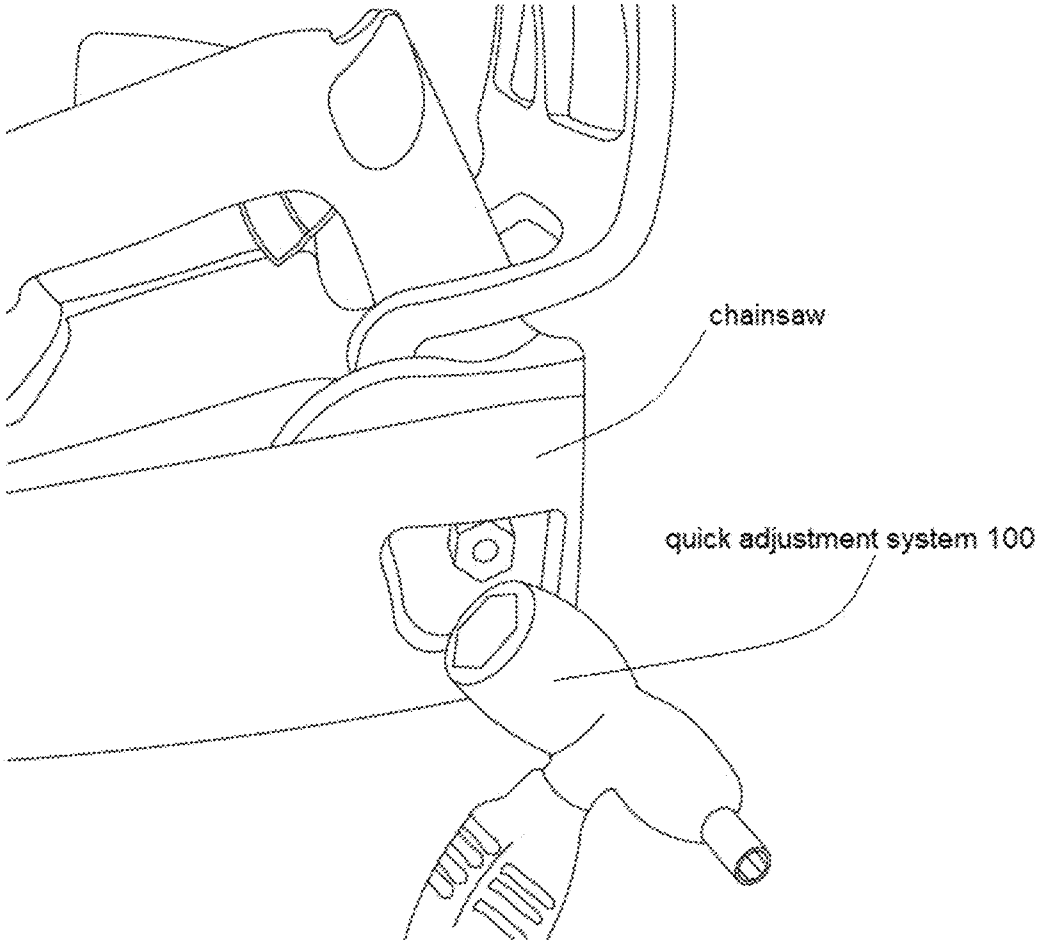
FIG. 9 shows another embodiment of a quick adjustment system in which a hexagonal wrench fitting matches or mates with a hexagonal fitting a within a chainsaw.

FIG. 8 shows a combined view of two separate quick adjustment systems 108, where the lower system $\mathbf{100}_L$ has a dog-bone (socket) wrench fitting at one end, and a flat-blade at the other end. Meanwhile, the upper system $\mathbf{100}_U$ has a dog-bone (socket) wrench fitting at one end, and a phillips-head or hex-key fitting at the other end. FIG. 9 shows another embodiment of a quick adjustment system 100 in which a hexagonal wrench fitting 904 matches or mates with a hexagonal fitting 908 within the chainsaw itself.

SUMMARY OF VARIATIONS SO FAR

Just to summarize, the quick adjustment system 100 can:

- attach to existing pull-cord but not replace existing pull-handle;
- attach to existing pull-cord and replace existing pull-handle;
- replace an entire pull-cord and thus replace existing pull-handle; or
- attach elsewhere, and not involve pull-cord at all.

Again just to summarize, the quick adjustment system 100 can incorporate:

- a phillips-head, flat-blade, hex key, file for sharpening chainsaw blades;
- multi-sized socket-heads, both English and metric, as well as 2-in-1 "hammerhead" sockets;
- a mini-flashlight, blade sharpener (e.g. file), or other usage enhancement; or
- a putty-blade, wider than flat-blade of a screwdriver, for cleaning wood-crud and sawdust from interior of the chainsaw where sawdust and crud builds up, and\or where the chainsaw blade meets the motor-sprocket.

A separate quick adjustment system 100 exists which clips to e.g. wrist or waist, semi-MMA-type wrist-glove with exposed fingers, e.g. 3-part tools on right hand, is always present but seldom intruding. This system 100 can have an open-tether or retracting-tether or elastic tether for quick tool-usage and then get back to cutting. Even better than a tool-belt, a wrist-belt, which is always near the hands, where tools are most-needed. However, again, care is needed to properly mount this to not be in-the-way.

Principles of Chainsaw Recoil

In typical chainsaw configurations, the pull-cord retracts according to a spring-mounted winding mechanism sometimes referred to as a "recoil" mechanism, or just "recoil". The recoil ensures the pull-cord is out of the way during operation so that the pull-cord is not left dangling or in the way of operation of the chainsaw. For various mechanical reasons, this pull-cord is intentionally kept short, so as to not interfere with the retraction-action of the recoil, and also because a shorter pull-cord can help a user generate greater torque (a "yank" effect).

When a user lets go of the pull-cord, the chain saw is started, the pull-cord "snaps back" and the pull-handle at the end is kind of the stopping-point of the recoil mechanism. Thus, the pull-handle and the quick adjustment system 100 must be sufficiently durable to withstand the recoil force of literally thousands of snap-back occurrences, where the pull-handle repeatedly hits the surface of the chainsaw body at very high impact. However, a chainsaw user that is sufficiently sensitized to the advantages and features of the embodiments herein might be motivated to slowly give back tension from the T-handle to the recoil mechanism.

Figure 11A:
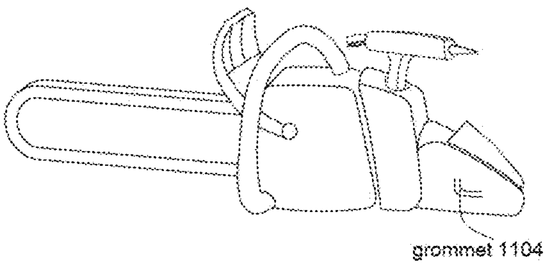
FIGS. 11A, 11B, and 11C show example grommets attached to the body of a chainsaw.
Figure 11B:
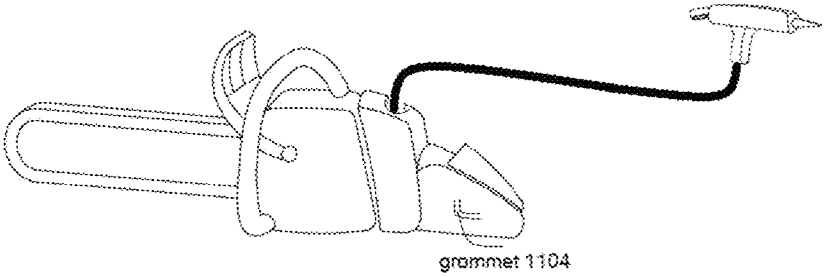
Figure 11C:
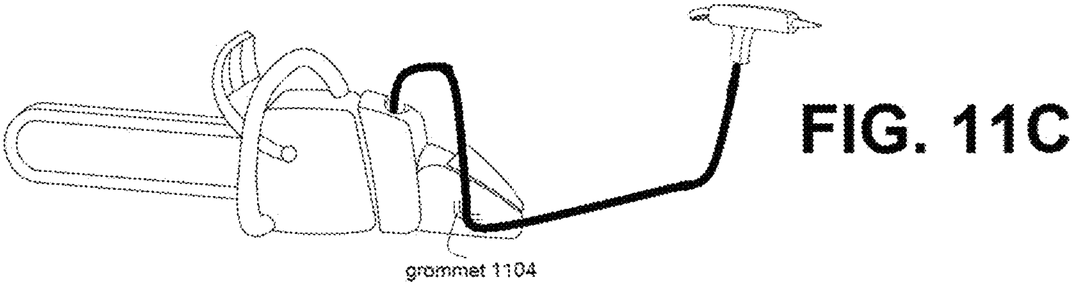

Next, another factor of recoil. A (preventable) annoyance of using the quick adjustment system 100 while attached to a pull cord might be that the screwdriving activity or wrenching activity may be more difficult while the recoil is continually trying to pull the quick adjustment system 100 away from the task. Accordingly, as shown in FIGS. 11A-11C, a grommet (or clinch) 1104 is shown attached to the body of the chainsaw. A user of the system 100 would lead the pull-cord through this grommet/clinch 1104, to leave themselves enough cord to operate the tool(s) within the system 100, and make the adjustment to the chainsaw. Upon completion, the user could slip the pull-cord out of the grommet/clinch 1104, allow the pull-cord to fully retract, and go back to operating the chainsaw as-normal.

Figure 12:
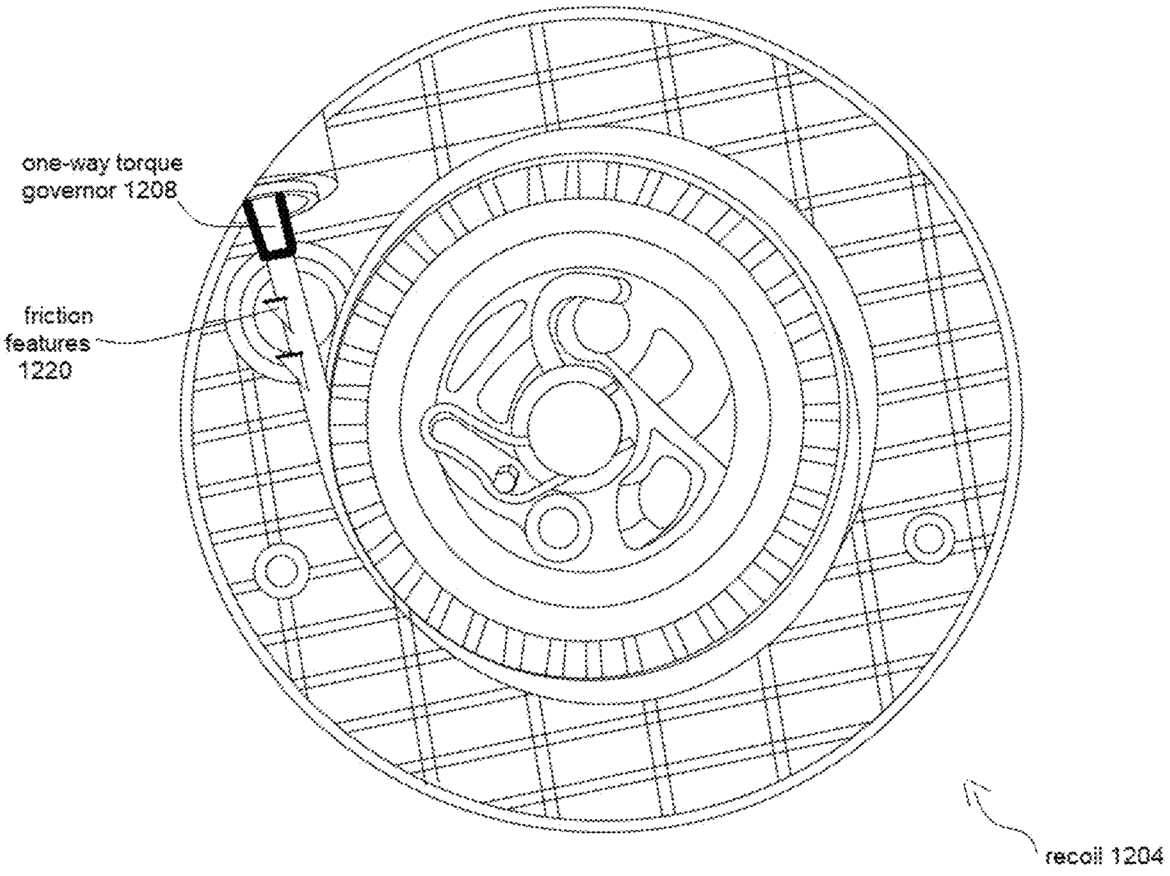
FIG. 12 shows possible adjustments to a recoil.

As shown in FIG. 12, possible adjustments to recoil 1204 could include a torque-governor 1208. Another is a predetermined cord-composition with a type of one-way friction feature 1220. Such a cord, and a specialized cord-guide, acts such that when the cord moves away from the recoil 1204 (e.g. a starter-yank) no resistance occurs. However, when the cord moves toward the recoil 1204, considerable resistance occurs. Because of this resistance, the pull-handle, and any embodiment of the quick adjustment system attached\embedded therewith, hits the body of the chainsaw with considerably less velocity upon snap-back.

Figure 14C:
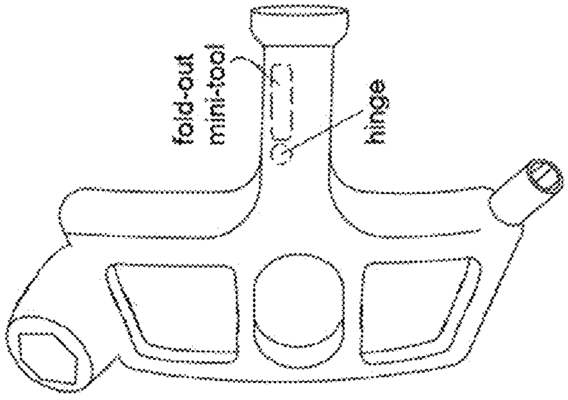
FIGS. 14A, 14B, and 14C show specialized attachment grooves and other add-on securing mechanisms, threaded surfaces, and sockets a quick adjustment system.
Figure 14B:
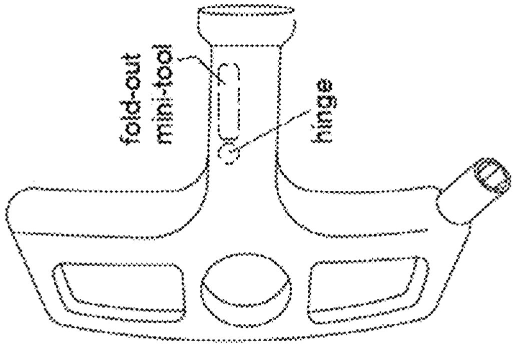
Figure 14A:
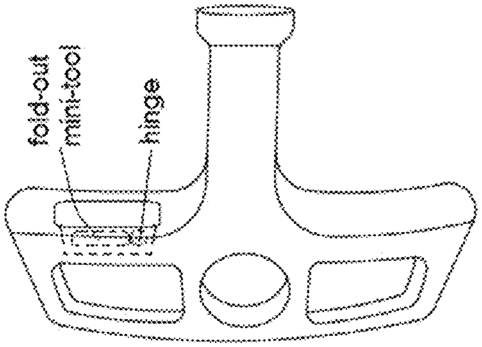

FIGS. 14A-14C show specialized attachment grooves and other add-on securing mechanisms, threaded surfaces, sockets, within a quick adjustment system 500. These must be secure enough to withstand the mechanical whiplash when the recoil 1204 does its very quick draw-back of the pull-cord. However, it is important to also note that any embodiment exists in which the pull-handle has sockets, threads or nutserts 1804 (e.g. FIGS. 14A, 14B, 14C, and 18), that these can be disabled, un-populated, or just unused. This might be where the chainsaw is being used on a convenient table-top or level environment in which all the needed tools are easily accessible.

Manufacturing Processes

The system 100 can be manufactured using a variety of processes, including but not limited to injection molding, extrusion molding, 3D printing, and other techniques. The wrench, screwdriver, or other features can be implanted into an existing handle using e.g. welding, soldering, implant molding, or overmolding.

Figure 18:
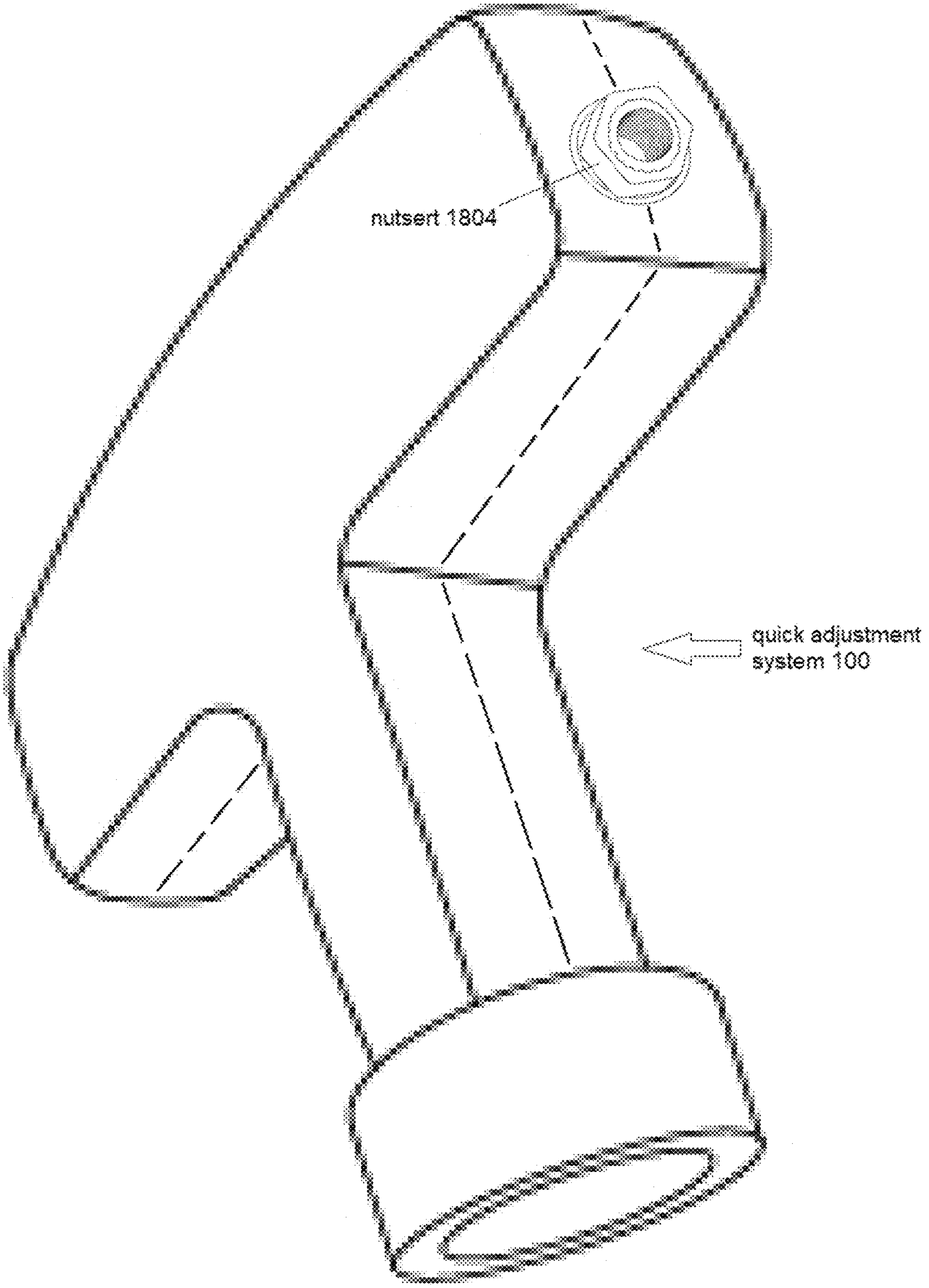
FIG. 18 shows an example quick adjustment system resulting from the process described in FIG. 17.

As shown in FIGS. 15B and 18, it is also possible to equip a pull-handle with threaded surfaces (FIG. 15) or nutsert 1804, either exterior or interior to the pull-handle. Then, attachments could be joined to the threaded surfaces at the selection of the user. Because there are many different chainsaw sizes and components, such a user-selection kit can make the various embodiments of the quick adjustment system 100 more flexible and have increased utility. The various accessories can be sold in a kit format, or be separately purchasable or user-selectable.

Figure 10:
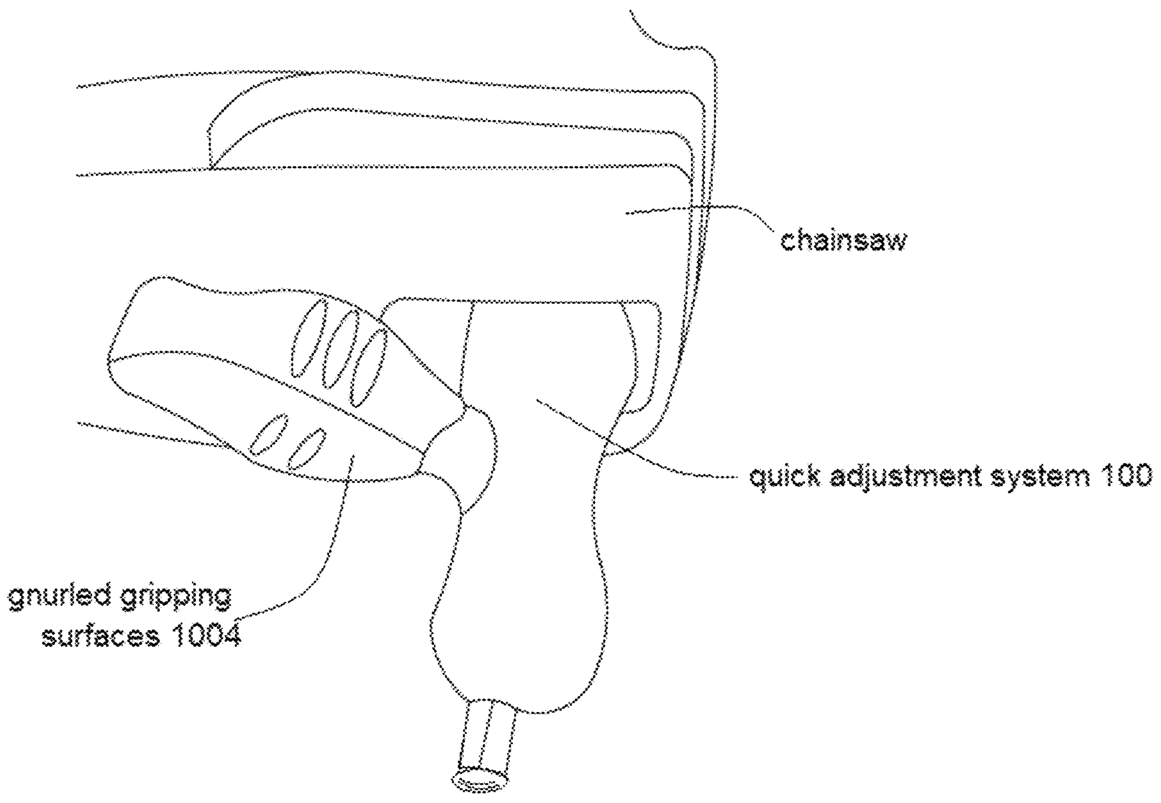
FIG. 10 shows ridges within a quick adjustment system.

As will be discussed in more detail herein, FIG. 10 shows knurled gripping surfaces 1004 located in the body of the system 100. The gnurled or gripping surfaces 1004 are formed being molded in, or grinded in some way, as shown elsewhere within this disclosure.

Next, the various metal portions of the quick adjustment system 100 such as but not limited to metal piece 404\1620 can be manufactured as follows. The process can start with precision milling and turning, and then hardening the metal piece 404\1620 in an annealing surface treatment. Then, black oxidation to achieve an accurate tip hardness and tip dimension of the metal piece 404\1620, where appropriate. If a handle or other finger-surface is necessary, it is also possible to include a first injection of polypropylene. Then, a second injection of high-impact polypropylene, followed by a third injection of a soft touch elastomer.

Regarding the finger-surfaces of any of the embodiments of the quick adjustment system 100, it may be suitable to include thermally-forming inlays. Any metal surfaces or blades can be chrome-plated for erosion resistance. Use of soft-touch elastomer with rigid surface can improve user grip.

Next, some possible molding steps. There are a couple of ways that injection molding can be used to combine two or more disparate materials into a single part, insert molding and overmolding. Insert molding places one component, the insert, onto a pin or other holding fixture inside of a plastic injection mold tool.

Figure 16:
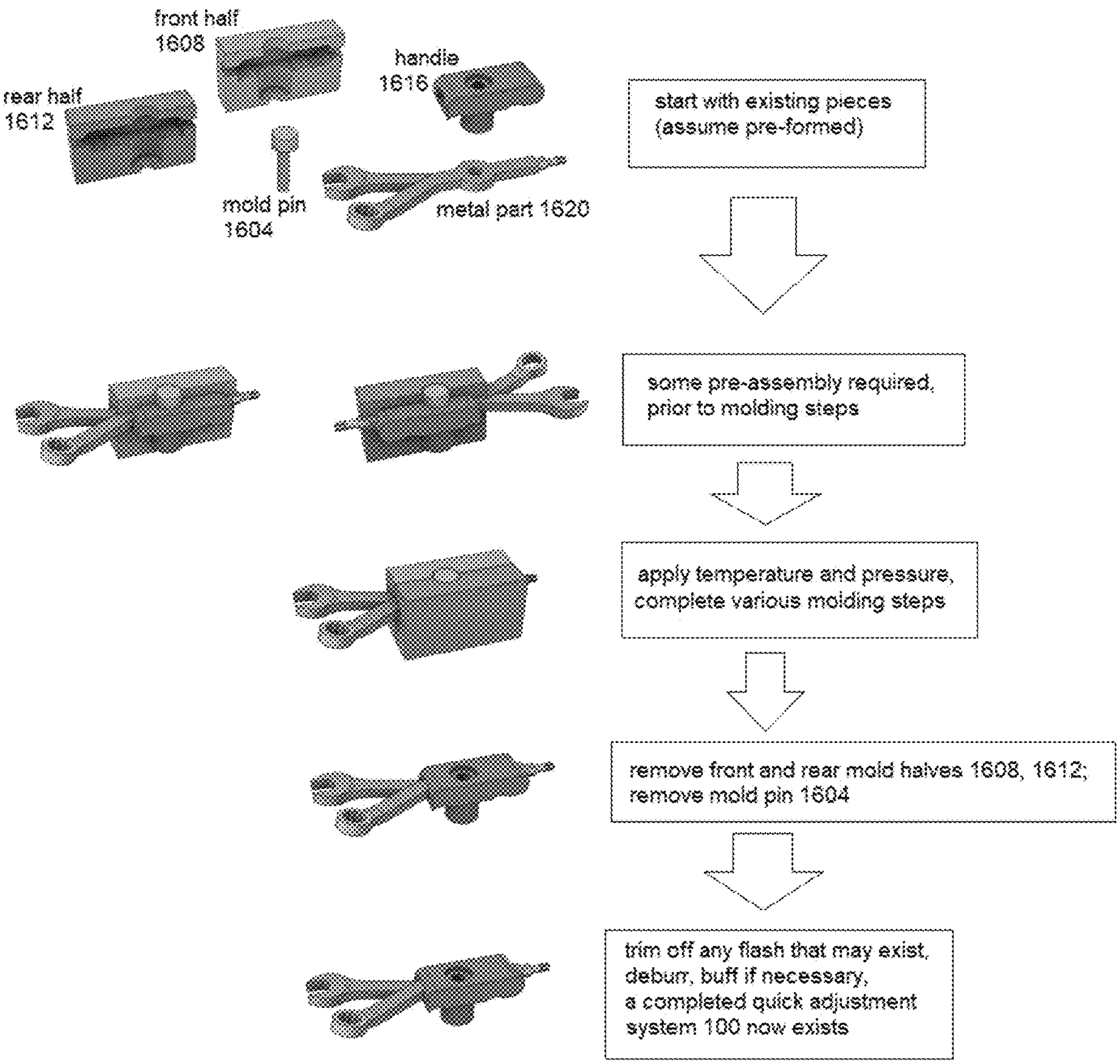
FIG. 16 shows one non-limited sequence for molding a quick adjustment system.

FIG. 16 shows one non-limited sequence for molding a quick adjustment system 100. A group of starting components comprise a mold pin 1604, front half 1608 of a mold enclosure, rear half 1612 of a mold enclosure, handle 1616, and metal part 1620. The handle 1616 and metal part 1620 are likely to be pre-made separately, and then perma-fused together in some kind of process including but not limited to the process shown in FIG. 16. From FIG. 16, the handle 1616 and metal part 1620 are loosely attached. The mold pin 1604 is inserted into both, and then the entire assembly is fit into the mold halves 1608 and 1612. Afterwards, various molding steps will occur.

Upon completion of the various molding steps, the mold halves 1608 and 1612 are removed, the resulting combination has any flash trimmed off, deburred, buffed, resulting in a completed quick adjustment system 100.

Figure 17:
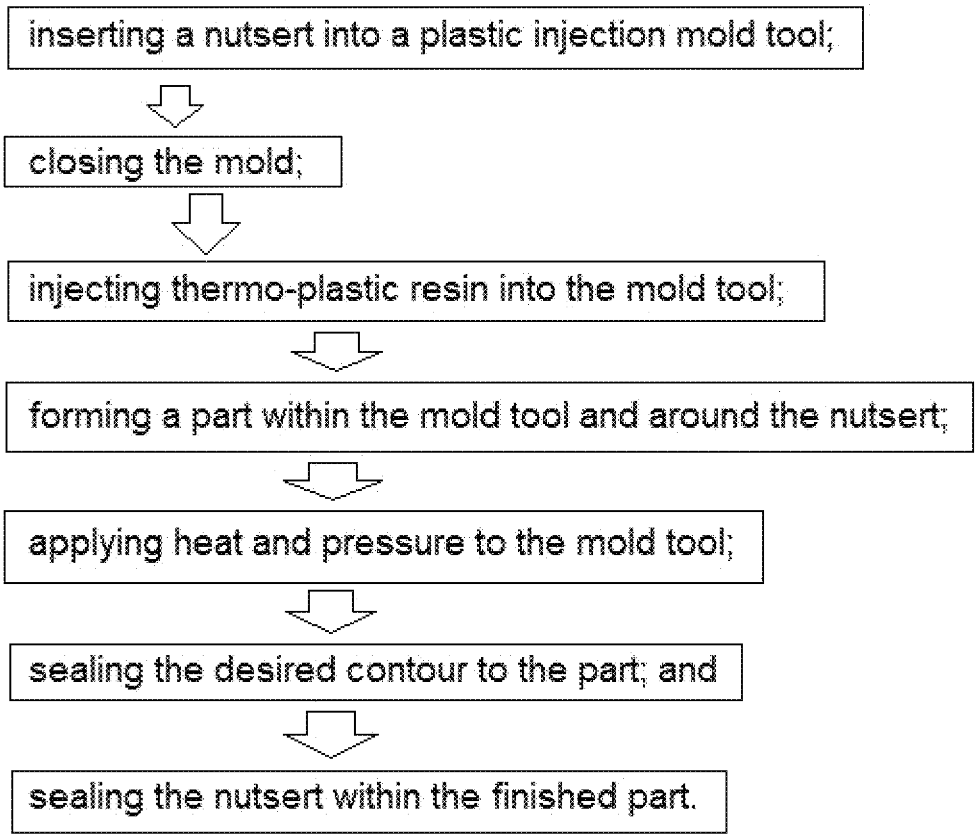
FIG. 17 shows a manufacturing flowchart.

As shown in the flowchart within FIG. 17, the mold closes, thermo-plastic resin is then injected, molded around the insert, heat and pressure are applied, and the desired contour is sealed it into place. The insert is usually a small metal or plastic piece, like a threaded screw fitting or an electrical contact. Threaded fittings are also called a nutsert, e.g. the nutsert 1804. The result of the process described in FIG. 17 is shown in FIG. 18.

Using inserts in this way, especially for threaded fittings, make sense because doing so avoids the need for extra drilling and tapping. Inserts can also be used on thin-walled chainsaw casings that otherwise wouldn't be thick enough to allow for a tapped hole.

Overmolding also known as multiple material molding, two shot or two K, is a type of plastic injection molding where a rubber or elastomer such as TPU or TPE is permanently overmolded onto a more rigid plastic substrate. Overmolding provides texture that improves the grip and feel for the user, such as the ridges 1020 within the quick adjustment system 100 shown in FIG. 10.

Figure 15C:
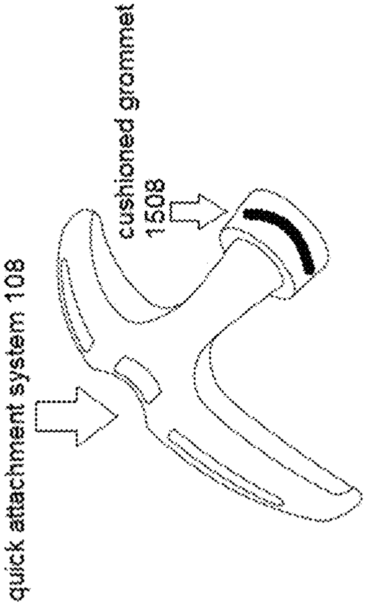
FIG. 15C shows a lower portion of an example quick adjustment system having a shock-grommet.

Overmoldings offer electrical and thermal insulation, and can make very tight seals for instrument casings such as the chainsaw cover (casing) partially shown in FIG. 15, which has a variety of attachments and also a nutsert. Overmolding can also be used to encapsulate other components, holding them firmly in place to overcome mechanical vibration such as by a chainsaw, which has a lot of vibration.

Overmolding is done with a special injection molding machine that has two barrels. One barrel typically holds a rigid thermoplastic. And the other one has some form of elastomer, such as TPE, TPU, or silicone. Drawbacks to insert molding exist. If holding strength is especially a concern, then the plastic chainsaw cover (casing) might need to be re-designed so that it locks the insert or nutsert in place. Next, cracks can form around an insert or nutsert 1804 due to stress. This is because the plastic resin shrinks upon cooling, while the metal does not. This is especially a problem with polycarbonate plastic. To address this, it is necessary to factor in resin shrinkage during design of the plastic chainsaw cover (casing).

Next, knowing that a typical screwdriver will be working in dirty/sawdusty situations, e.g. the metal piece 404\1620, a partially-formed screwdriver blade (of whatever variety, flat, phillips, etc) is twirled in a machine that blasts the tips with mild abrasive. This texturize is the surface to allow this screwdriver to really grip a screw head.

Next, it is also possible to carve ridges into the bevels of the cross points within a metal shaft of a screwdriver or other metal piece, in some cases to yield extra gripping surfaces. These bevels are pressed, then slammed into the other end of the screwdriver to create flanged grooves. These grooves will allow them to lock the screwdriver shaft into its handle. A vibrating feeder causes the screwdrivers to chafe against each other, which also removes any waste material and texturizes the metal shafts.

Moving back to the embodiments shown in FIGS. 4A-4B and 5A-5B, methods of manufacture can include but are not limited to the following. The metal part 404 (steel material with a hexagonal head and a flat end): using cold stamping, welding, and powder coating methods. The metal part can be made of CT3 steel.

Meanwhile, the plastic part 408 can be created using plastic injection molding. The plastic part can be made of PP 1100 resin.

The steel within the hexagonal head will be processed and stamped, then welded with the flat end steel. After processing, it will be inserted and pressed into the plastic part, giving rise to a completed, installation-ready quick adjustment system 100.

DISCLAIMER

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations, or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations, or equivalents. It is intended that the following claims define the scope of the invention and that methods and structures within the scope of these claims and their equivalents be covered thereby.

What is claimed is:

1. A method of configuring a quick adjustment system for a chainsaw, comprising:

positioning one or more chainsaw-related tools to be stored within a pull-handle thereby forming the quick adjustment system;

wherein the pull-handle defines a pulling portion and a connecting portion to a cord of the chainsaw, wherein the pulling portion defines two opposite free ends;

attaching the quick adjustment system to the chainsaw via the cord;

wherein the quick adjustment system is a combination of a fixed-position non-foldable non-hinged wrench and a fixed-position non-foldable non-hinged screwdriver;

wherein each of said one or more chainsaw-related tools is formed of a metal part fitted within a plastic pulling portion of the pull-handle:

wherein each of said one or more chainsaw-related tools within the quick adjustment system is exposed from both said opposite ends of the pull-handle with the wrench extending out from one end and the screwdriver extending out from the other opposite end, such that each of said one or more chainsaw-related tools is accessible, available, and ready for use with no further manual moving to-from the storage position is necessary; and wherein the storage-position and the usage-position are the same.

2. The method of claim 1, further comprising:

utilizing the original pull-cord but removing an existing pull handle from that original pull-cord; and attaching a quick adjustment system to that original pull-cord.

3. The method of claim 1, further comprising:

attaching a quick adjustment system to a customized pull-cord;

completely removing the original pull-cord and pull-handle from a chainsaw; and substituting the quick adjustment system that is attached to the customized pull-cord.

4. The method of claim 1, further comprising:

attaching a quick adjustment system to a customized pull-cord to have a male-threaded surface securely attached thereto;

configuring a plurality of quick adjustment systems to have a female-threaded aperture at their base; and facilitating attachment by a plurality of quick adjustment systems embedded into pull-handles having female threading at their base, where that female threading matches with the male-threaded pull-cord.

5. The method of claim 1, further comprising:

attaching a quick adjustment system to a chainsaw by a separate tether defining the cord that is not involved with the existing pull-cord.

6. The method of claim 1, further comprising:

attaching the quick adjustment system to an existing pull-cord but not replacing an existing pull-handle.

7. The method of claim 1, further comprising:

attaching to existing pull-cord and replacing existing pull-handle.

8. The method of claim 1, further comprising:

replacing an entire pull-cord and thus replacing an existing pull-handle.

9. A method of configuring a quick adjustment system for a chainsaw, comprising:

positioning a chainsaw-related tool to be stored within a pull-handle thereby forming the quick adjustment system;

wherein the pull-handle defines a connecting portion to a cord of the chainsaw and a pulling portion, wherein the pulling portion defines two opposite free ends;

attaching the quick adjustment system to the chainsaw;

wherein the chainsaw-related tool is a combination of a fixed-position non-foldable non-hinged wrench and a fixed-position non-foldable non-hinged screwdriver;

wherein the fixed-position non-foldable non-hinged wrench includes two differently sized and/or shaped wrench heads;

wherein the chainsaw-related tool within the quick adjustment system is exposed from both said opposite ends with both wrench heads extending out from one end and the screwdriver extending out from the other opposite end, such that the chainsaw-related tool is accessible, available, and ready for use, and where no further manual moving to-from the storage position is necessary; and wherein the storage-position and the usage-position are the same.

10. The method of claim 9, wherein said two heads define an open-end wrench and a box-end wrench.

* * * * *